United States Patent [19]
Annamalai

[11] Patent Number: 4,835,776
[45] Date of Patent: May 30, 1989

[54] COMMUNICATION FILTER

[75] Inventor: Kadiresan Annamalai, Milpitas, Calif.

[73] Assignee: Advanced Micro Devices Inc., Sunnyvale, Calif.

[21] Appl. No.: 73,532

[22] Filed: Jul. 15, 1987

[51] Int. Cl.⁴ ............................................... G06F 11/10
[52] U.S. Cl. ........................................ 371/49; 371/14; 371/57
[58] Field of Search ........................... 371/49, 57, 14; 364/900

[56] References Cited
U.S. PATENT DOCUMENTS

| | | | |
|---|---|---|---|
| 4,208,650 | 6/1980 | Horn | 371/47 |
| 4,692,894 | 9/1987 | Bemis | 364/900 |
| 4,700,358 | 10/1987 | Duncanson et al. | 371/49 |
| 4,703,486 | 10/1987 | Bemis | 371/41 |

Primary Examiner—Charles E. Atkinson
Attorney, Agent, or Firm—Kenneth B. Salomon; Richard E. Cummins

[57] ABSTRACT

Method and apparatus is disclosed which disables which disables a repeater connected to a packet-based network so that improper symbols are not propagated. A communications management unit employing the invention would, upon reception of an improper symbol, cause transmission to halt. The invention implements a three-state machine. Reception of any improper symbol, or symbol with a parity error, causes entry into a forced-halt state. Reception of an IDLE symbol causes transition to a forced-idle state. Return to the start state occurs upon reception of a start-of-packet symbol pair.

12 Claims, 3 Drawing Sheets

ABBREVIATIONS:
QHVCON: CONVERT QUIET, HALT & VIOLATION
PE: PARITY ERROR
PARCON: PARITY ERROR CONVERT
QHV: QUIET, HALT OR VIOLATION

COMMUNICATION FILTER

CROSS-REFERENCE TO RELATED CO-PENDING APPLICATIONS

Related, co-pending applications of interest to the instant application are U.S. Ser. No. 683,281 filed Dec. 18, 1984, entiled "Communication Data Encoder/Decoder Component System Architecture" on behalf of Gerald L. Bemis which issued on Oct. 27, 1987 as U.S. Pat. No. 4,703,486 and U.S. Ser. No. 683,434 filed Dec. 18, 1984 reentitled "Overflow Underflow for Elastic Buffer" on behalf of Gerald L. Bemis which issued on Sept. 8, 1987 as U.S. Pat. No. 4,692,894, both assigned to the assignee of the instant application.

FIELD OF THE INVENTION

The invention relates to the transmission of signals onto a telecommunications network and, more particularly, to the detection of spurious signals and the prevention of false connection to the network.

BACKGROUND OF THE INVENTION

Interconnection in a network of electronic equipment is typically governed by standard data "protocols" which specify how a particular node in the network will receive and transmit information over the network. This information is generally contained in "packets" having a definite format and a packet is preceded and terminated by special symbols for ease of recognition.

Connection management procedures are designed to recognize these special symbols and to initiate proper connection to the network. The procedures should avoid false connection as well as detect the presence of spurious signals on the network. Generation of spurious signals on the network is obviously an important problem.

Spurious signals can arise from excessive noise on the network. In a typical network configuration, nodes on the network act as "repeaters". That is they receive signal packets, decode them, encode them and transmit them to another node. Spurious symbols received should, accordingly, be detected and not propagated. This detection process aids in the isolation of faulty nodes. Additionally, these noisy symbols could be misinterpreted as connection management symbols and could falsely initiate connection of a node to the network.

Besides noisy symbols, a portion of a packet may have a parity error which could also be misinterpreted.

SUMMARY OF THE INVENTION

In accordance with the present invention, improper symbols, such as noisy symbols or those with a parity error, are not propagated on a communication network. A communications management unit employing a circuit according to the invention would, upon reception of an improper symbol, cause the transmission of symbols to halt.

Accordingly, improper symbols are not propagated on the network by a node employing the instant invention. As a consequence, false interconnections are avoided and noisy symbols, which might be misinterpreted are eliminated. By detecting the presence of improper symbols, faulty nodes within the network can be isolated.

The invention is described in terms of a state machine having three states. On reset, endez is in "through" state, (first state). Reception in the first state of any improper symbol, halt (H), quiet (Q), violation (V), isolated J, isolated K, or any symbol with a parity error, causes entry into a second (forced halt) state. Any proper symbol received in the first state is transmitted. An IDLE symbol received when in state one, causes transition to a third (forced idle) state. Return to the reset state is accomplished by reception of a JK symbol-pair. Apparatus implementing the three-state machine of the instant invention is disclosed.

DESCRIPTION OF A PREFERRED EMBODIMENT

The instant invention will be described by reference to an encoder/decoder (ENDEC) which is the subject matter of the related, co-pending application entitled "Communication Data Encoder/Decoder Component System Architecture" cross-referenced to the instant application. The description of the ENDEC contained therein is incorporated by reference herein. Employing this specific application of the filter of the instant invention is for the purposes of exposition only; those familiar with the art will appreciate a variety of applications for the filter of the instant invention.

Figure 1:
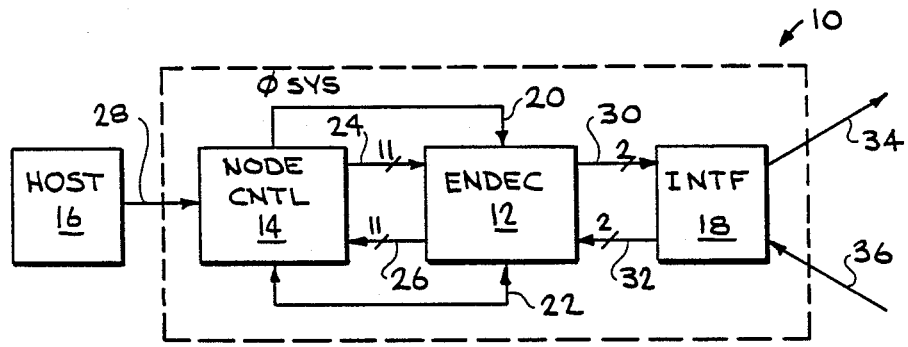
FIG. 1 is a simplified block diagram of an exemplary local area network node and its associated host.

FIG. 1 illustrates the typical manner of utilizing a local area network node 10 to interconnect a host computer system 16 with a physical network media 34, 36. Typically, the node 10 will include a node controller 14, an encoder/decoder/ or ENDEC, 12 and an interface unit 18 as integral system components. The host computer 16 typically communicates with the node controller 14 of the node 10 over a bidirectional data bus 28. The node controller 14, in turn, transfers data to and from the ENDEC 12 over the data busses 24, 26, respectively. In addition, the node controller 14 controls and determines the status of the ENDEC 12 by means of the control bus 22. A system clock, $\theta$sys. is provided on the clock line 20 to the ENDEC 12 to ensure that the system components are properly synchronized.

The ENDEC 12 functions to prepare the raw transmitter data provided by the node controller 14 for transmission to the interface system component 18 over the serial data bus 30 and, subsequently, onto the network media 34. The ENDEC 12 further functions to recover data received from the network media 36 via the interface system component 18 and the serial data bus 32. This recovered data is then transferred to the node controller 14 over the return data bus 26.

The interface system component 18 functions to provide a physical interconnect between the node 10 and network media 34, 36. As such the interface 18 may simply be a coaxial "T" connector, for example. Depending on the nature of the network media 34, 36, however, the interface may perform a more complex function. Where the media 34, 36 is an optical fiber communications cable, the interface 18 also preferably includes an electro-optic transmitter and receiver.

Finally, the network media 34, 36 itself is preferably only a passive single high-speed serial data bus that physically interconnects each of the nodes 10. The topology of the network, i.e., ring, redundant loop, or linear, is thus established by how the nodes are interconnected, in terms of nearest neighbor relationships, by the physical network media.

There are a number of somewhat different networking protocols, or systematic procedures of operation, that may be implemented to control the overall operation of the network. A design choice in the assemblage of the network is the selection of one of these protocols for implementation. One exemplary protocol, and the one preferably implemented in a network utilizing the present invention, is a token-passing, ring topology network protocol wherein communication between nodes is by means of data packets. A general description and discussion of this protocol and its principles of operation as well as other conventional protocols may be had by reference to "New Standards for Local Networks Push Upper Limits for Light Wave Data", S. Joshi, et al., *Data Communications*, July 1984, pp. 127–38.

In brief, the exemplary protocol calls for the ordered access of each node to the entire network. A node having the right to access the network, i.e., the current "token" holder, may initialize a network communication sequence wherein a number of data packets are exchanged with one or more other network nodes. At the conclusion of the communication sequence, the "token" is passed to the next successive node of the network. Another communication sequence may then be initialed by the "token" holder.

Typically, the data packets are themselves only a part of a continuous data stream that traverses the network. As will be described in greater detail below, each packet includes a header portion, a data body portion, and a trailer portion. The packets may be separated from one another in the data stream by a filler code that acts to maintain status communication between all of the nodes by reflecting the line-state of the network even though no data packets are being transferred. The most primitive or basic protocol functions performed by a node include recognizing the current line-state of the network and asserting requests with respect to the line-state.

The present invention provides an encoder/decoder component system fully capable of performing all of the required functions of an ENDEC 12 in a local area network node. Accordingly, FIG. 2 provides a block diagram of the preferred embodiment of an ENDEC 12 consistent with the present invention.

The ENDEC 12 includes two major subsections $12_T$, $12_R$. The first is a transmitter subsection $12_T$ including a multiplexer 46, register 60 and encoder 62, selector 64, serial shift register 66, non-return-to-zero invert-on-ones (NRZI) converter 68, and an AND gate 42. The receiver subsection $12_R$ includes a multiplexer 40, buffer 50, decoder 52, multiplexer 44, and register 48. These two subsections are jointly controlled by a command management (CMT) unit 56 and a clock unit 54.

Figure 2:
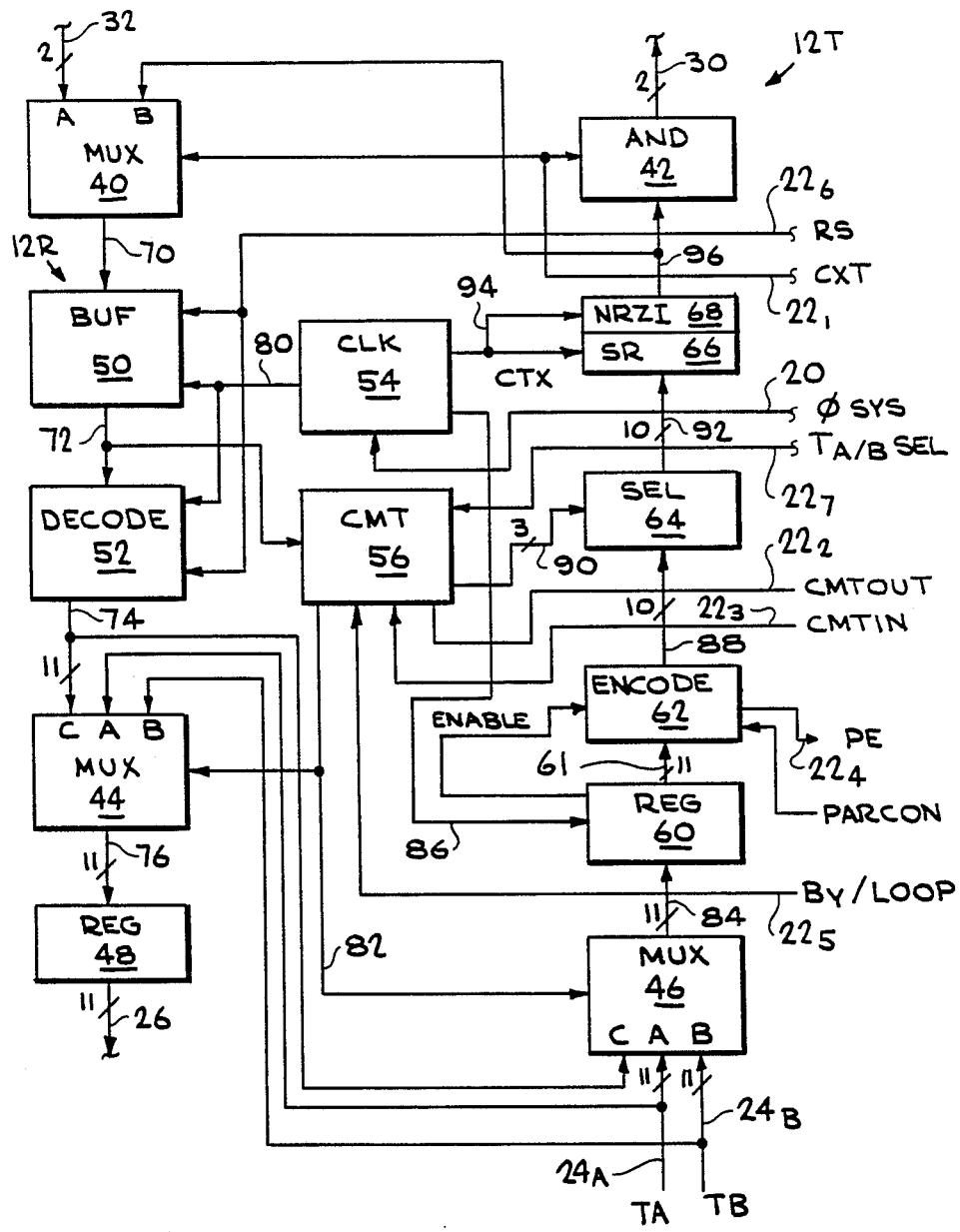
FIG. 2 is a block diagram of the principle components of an encoder/decoder (ENDEC) suitable for use with the filter of the instant invention.

Reference should be had to the related, co-pending applications for a description of the various elements illustrated in FIG. 2. Which description is incorporated by reference herein.

In accordance with the preferred embodiment of the present invention, the encoder 62 implements a 4B/5B encoding scheme wherein each high and low order nibble of the data byte is encoded in combination with its respective control/data bit to provide 2 five-bit code symbols. Table I sets forth each unencoded data nibble, as well as its preferred corresponding encoded bit group and code symbol assignment. Preferably each data packet header includes a JK code symbol pair as a start delimiter following by a data body of data code symbols, further followed by a trailer beginning with a terminator code symbol and, optionally, a following control symbol. The filler portion of the data stream between data packets is itself simply a sequence of line-state symbols that appropriately indicate the current status of the network medium.

TABLE I

| Symbol group | Control Data Bit | Data Nibble (Hex) | Encoded Bit Group | Symbol | Assignment |
|---|---|---|---|---|---|
| Starting Delimiters | 1 | C | 11000 | J | Start of Packet header |
|  | 1 | 3 | 10001 | K |  |
| Data Symbols | 0 | 0 | 11110 | 0 |  |
|  | 0 | 1 | 01001 | 1 |  |
|  | 0 | 2 | 10100 | 2 |  |
|  | 0 | 3 | 10101 | 3 |  |
|  | 0 | 4 | 01010 | 4 |  |
|  | 0 | 5 | 01011 | 5 |  |
|  | 0 | 6 | 01110 | 6 |  |
|  | 0 | 7 | 01111 | 7 |  |
|  | 0 | 8 | 10010 | 8 |  |
|  | 0 | 9 | 10011 | 9 |  |
|  | 0 | A | 10110 | A |  |
|  | 0 | B | 10111 | B |  |
|  | 0 | C | 11010 | C |  |
|  | 0 | D | 11011 | D |  |
|  | 0 | E | 11100 | E |  |
|  | 0 | F | 11101 | F |  |
| Ending Delimiter | 1 | D | 01101 | T | Termination |
| Control Indicators | 1 | 1 | 00111 | R | Reset |
|  | 1 | 9 | 11001 | S | Set |

The encoder 62, in the process of encoding each data byte also regenerates a parity bit that is then compared to the parity bit supplied with the original parallel data word to determine whether an error has occurred in the transfer of the parallel word from at least the node controller node 14 to the ENDEC 12. The parity error, if present, is reported back to the node controller 14 over the control bus line $22_4$. A parity control (PARCON) signal is received by the ENCODER 62. This signal is generated by node controller 14 and indicates whether the ENDEC 12 is operating in a parity-checked mode; i.e., that eight data bits, two control bits and one parity bit are received from the network. A parity error (PE) signal is indicated by the ENCODER 62 and indicates detection of a parity error by encoder 62 when the parity-check mode is effective.

The encoded data is passed via the encoded data word bus 88 to a selector circuit 64 where, nominally, it is further passed via the parallel bus 92 to the serial shift register 66. As will be described in greater detail below, the CMT unit 56 may direct, via selector control lines 90 that that selector 64 generate and select line-state and, possibly, error code symbols for subsequent transmission. In any case, the code symbols received by the serial shift register 66 are parallel-to-serial converted in response to a transmitter clock signal CTx provided by the clock unit 54 over clock line 94. The serialized data provided by the serial shift register 66 is further converted by a conventional non-return-to-zero invert-on-ones (NRZI) converter 68 to the corresponding preferred serial format. The resulting NRZI data is then provided to the AND gate 42 via the serial data line 96. The serial data stream is preferably further converted to a conventional differential signal by the AND gate 42 and provided on the serial data line pair 30 to the inteface system component 18 for transmission.

The CMT unit 46 of the ENDEC 12 is itself directly controlled by the node controller 14 via the CMTIN lines $22_3$, the bypass/loop control lines $22_5$ and the transmitter A/B source select line $22_7$. The CMTIN control lines $22_3$ permit the node controller 14 to specify to the CMT unit 56 that it is to operate the selector 64 of the ENDEC 12 so as to implement specific primitive local area network protocols to establish the node 10 as, for example, a peer, master or slave unit. The status of the CMT unit 56, as well as the line-state of the network as perceived by the CMT unit 56, is reported back to the node controller 14 via the CMTOUT lines $22_2$. The CMTIN control lines $22_B$ also permit the node controller 14 to functionally disable the CMT unit 56 so that no primitive protocols are implemented. The nature and purpose of the preferred primitive protocols, as well as the operation of the CMT unit 56, will be described in greater detail below.

The bypass/loop control lines $22_5$, transmitter A/B source select line $22_7$ and the connector control line $22_1$ together permit the node controller 14 to select the data stream paths through both the transmit and receive subsections $12_T$, $12_R$ of the ENDEC 12. Significantly, this allows the node controller 14 to configure the data paths through the ENDEC 12 to implement a high degree of self-diagnostic capabilities within the node 10. That is, the node controller 14 may bypass the majority of the ENDEC 12 by routing a transmitter parallel data stream from either of the transmitter input lines $24_A$, $24_B$ through the multiplexer 44 and register 48 directly back to the node controller 14, thereby allowing direct testing of the parallel data path between the node controller 14 and the ENDEC 12. Substantially all of the internal circuitry of the ENDEC 12 may also be tested by the node controller 14 by appropriately selecting a loop-back path from the output of the NRZI unit 68 to the multiplexer 40 via the serial data line 96 and back through essentially the entire receive subsection of the ENDEC 12.

Further, the node controller 14 may elect to allow another node of the local area network to evaluate the operation of the ENDEC 12 and all the intervening components of the network. That is, the node controller 14 may select via the bypass loop-back control lines $22_5$ to configure the multiplexer 46 to select the decoded receive parallel data from the decode unit 52 to be passed by the multiplexer 46 as the parallel data to be encoded, serialized and subsequently retransmitted onto the network media. In this manner, large sections of the network can be evaluated so as to determine those elements that, for example, contribute to the progressive degradation of data as it is passed through the corresponding section of the network.

Figure 3:
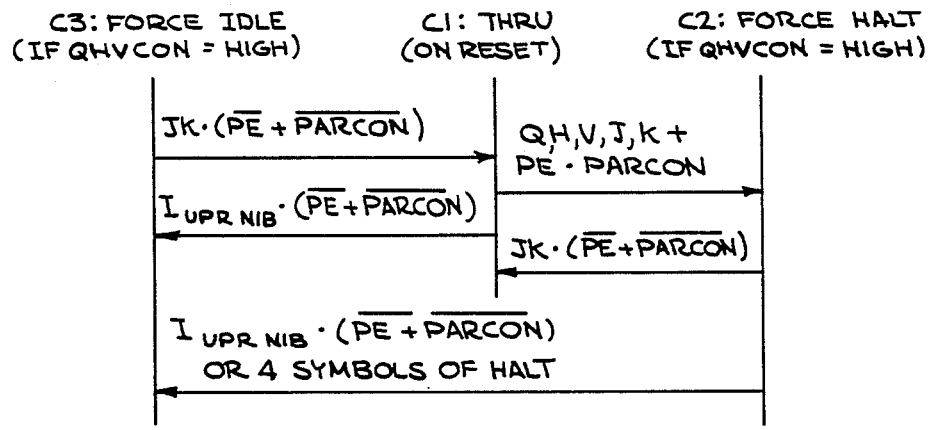
FIG. 3 is a state diagram of the communications filter of the instant invention.

The filter of the instant invention is preferably included within the encoder 62. With reference to FIG. 3, a state diagram of the filter of the present invention is shown.

Upon initialization of ENDEC 12, the filter transits to a "through" state. In this state proper symbols are converted and transmitted "through" to the network.

In the through state, if a quiet (Q), halt (H), violation (V), isolated J, isolated K symbol, or any symbol undefined in Table I is encoded, or a parity error, in the case of parity-enabled operation (i.e., PARCON signal active), is detected by encoder 62, then the filter transits to a "force halt" state and encoding is disabled.

Reception of an idle symbol (I) without a parity error, in the case of parity-enabled operation, in the "through" state causes a transition to a "force idle" state. Idle symbols are subsequently transmitted onto the network in the "force idle" state.

Reception of the JK symbol pair without a parity error, in the cae of parity-enabled operation, in the "force halt" state causes transition back to the "through" state. Reception of the I symbol as the upper "nibble" without a parity error, in the case of parity-enabled operation, in the "force halt" state causes transition back to the "force idle" state.

The filter remains in the "force halt" state until either four halt symbols are transmitted or reception of an I symbol as the upper "nibble" without a parity error, in the case of prity-enabled operation. Upon occurrence of either event, the filter transitions back to the "force idle" state.

The filter remains in the "force idle" state until reception of the JK symbol pair without parity error, in the case of parity-enabled operation, or until the encoder 62 is reset.

Figure 4:
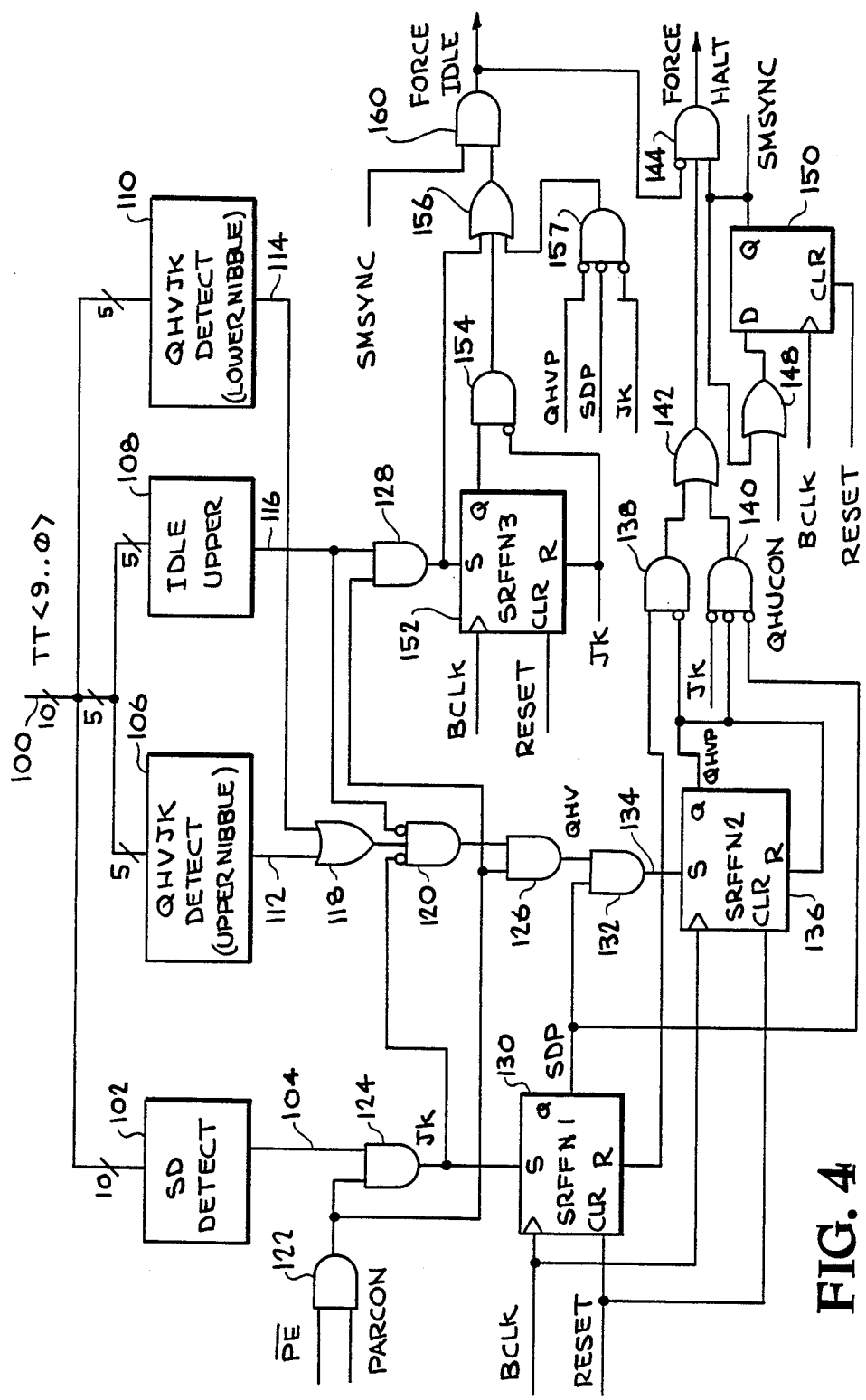
FIG. 4 is a logic diagram of a communications filter according to the instant invention.

With reference now to FIG. 4, an implementation of a filter of the present invention is shown in logic diagram form. A set of signal lines, being a bus 100, conducts the ten-bit signals generated by the register 60. (This bus is denoted by the reference numeral 61 in FIG. 2 and also includes the one-bit parity signal).

A start data (SD) detector 102 receives all ten bit signals conducted on bus 100. SD detector 102 generates a HIGH logic signal on signal line 104 if the JK symbol pair is present on bus 100.

A Quiet, Halt, Violation, J, K or any undefined symbol (QHVJK) detector 106 receives the upper, or most-significant, 5-bit nibble signals conducted on bus 100, as does an idle detector 108. A similar (QHVJK) detector 110 receives the lower, or least-significant, 5-bit nibble signals conducted on bus 100.

The QHVJK detectors 106 and 110 generate a HIGH logic signal on lines 112, 114 respectively, if one of the symbols Q, H, V, J or K, or undefined symbols, signals are present on the most-significant, least-significant 5-bit signals, respectively, conducted on bus 100. The idle detector 108 generates a HIGH logic signal on line 116, if the most-significant 5-bit signals conducted on bus 100 represents an idle (I) symbol.

An OR gate 118 receives the signals conducted on lines 112 and 114 and generates therefrom a signal conducted to a true input of an AND gate 120. An AND gate 122 receives the complemented parity error (PE) signal generated by the excoder 62 and the PARCON signal generated by node controller 14. The signal generated by AND gate 122 is conducted to the first input of an AND gate 124, and AND 126 and an AND gate 128.

A second input of AND gate 124 receives the signal generated on line 104 and generates therefrom a "JK" logic signal; a logic HIGH thereof indicative of the presence of the JK pair of symbols on bus 100 and the absence of a parity error in the unencoded symbols. The "JK" signal is also conducted to a first complemented input of AND gate 120. A second complemented input of AND gate 120 receives the signal generated on line 116. AND gate 120 generates a signal conducted to a second input of AND gate 126 which generates a "QHV" signal therefrom; a HIGH logic signal indicating the presence of either an isolated J or K symbol or a Q, H or V symbol at either the upper or lower nibble of the signals on bus 100, no I symbol in the upper nibble of the signals on bus 100, and the absence of a parity error, in the case of a parity-enabled operation.

The signal conducted on line 116 is also conducted to a second input of AND gate 128; AND gate 128 generates a HIGH logic signal indicating the presence of an I signal in the upper nibble of the signals on bus 100.

A set-reset flip-flop 130 receives the byte clock (BCLK) signal at its clock input and a RESET signal at its clear input. The "JK" signal generated by AND gate 124 is received at the set input of flip-flop 130. The output generated at the (Q) output of flip-flop 130 is conducted to a first input of an AND gate 132; a HIGH logic signal indicating the start of a data packet (SDP). The signal generated by AND gate 132 is conducted via signal line 134 to the reset input of flip-flop 130. Accordingly, flip-flop 130 will be reset after the detection of a HIGH QHV signal.

A second set-reset flip flop 136 receives the signal conducted on line 134 at its set input. The BCLK signal is received at the clock input of flip-flop 136 and the RESET signal is received at the clear input of flip-flop 136. The signal generated at the (Q) output of flip-flop 136 is conducted to a complement input of an AND gate 138; a HIGH logic signal indicating the presence of one of Q, H, isolated J, isolated K, any undefined symbol or V symbol within a data packet (QHVP). The QHVP signal is also conducted to the reset input of flip-flop 136 and to a true input of an AND gate 140. The signal conducted on line 134 is conducted to a true input of AND gate 138. The "JK" signal generated by AND gate 124 is received at a first complemented input of AND gate 140. The SDP signal generated by flip-flop 130 is received at a second complemented input of AND gate 140. The signals generated by AND gates 138 and 140 are conducted to the inputs of an OR gate 142. The signal generated by OR gate 142 is conducted to a first true input of an AND gate 144.

A QHV convert (QHVCON) signal 300 is generated by the node controller 14 indicating enablement of the filter. The QHVCON signal is received at a first input of an OR gate 148. The output signal generated by OR gate 148 is conducted to the data input of a D-type flip-flop 150. The BCLK signal is received at a clock input of flip-flop 150 and the RESET signal is received at a clear input of flip-flop 150. The signal generated at the (Q) output of flip-flop 150, a state machine enable (SMSYNC) signal is conducted to a second input of OR gate 148 and a second true input of AND gate 144.

A third set-reset flip-flop 152 receives at its set input the signal generated by AND gate 128. Flip-flop 152 receives the BCLK signal at its clock input and the RESET signal at its clear input. The "JK" signal generated by AND gate 124 is conducted to the reset input of flip-flop 152 and to a complemented input of an AND gate 154. The signal generated at the (Q) output of flip-flop 152 is conducted to a true input of AND gate 154.

The signal generated by AND gate 154 is conducted to a first input of an OR gate 156. A second input of OR gate 156 receives the signal generated by AND gate 128. An AND gate 157 receives at a first complement input the QHVP signal, at a second complemented input the SDP signal, at a third complemented input the "JK" signal and generates therefrom a signal conducted to a third input of OR gate 156. The signal generated by OR gate 156 is conducted to a first input of an AND gate 160. A second input of AND gate 160 receives the SMSYNC signal generated by flip-flop 150. AND gate 160 generates a FORCE IDLE signal which is conducted to a complemented input of AND gate 144. AND gate 144 generates a FORCE HALT signal.

What is claimed:

1. A method of controlling an encoder which converts a sequence of received unencoded symbols from a symbol alphabet comprising valid symbols including a start symbol pair and invalid symbols to encoded symbols according to a predetermined code whereby a valid symbol having an invalid parity is selectively prevented from being encoded, said method comprising the following combination of sequential steps,
   a) supplying a reset signal to said encoder to enable said encoder to convert said sequence of received unencoded symbols,
   b) supplying a parity check mode control signal selectively to said encoder when said encoder is enabled to place said encoder in a parity check mode wherein each said received symbol is parity checked,
   c) determining if a received symbol is valid or invalid,
   d) performing a parity check on each said symbol that is determined to be valid, and
   e) disabling said encoder in response to
      1) determining that a received symbol is invalid, or
      2) determining that a valid symbol in said sequence has an incorrect parity when said encoder is operating in a parity check mode.

2. The method recited in claim 1 in which said encoder has three distinct operating states including a reset state in which said encoder is enabled to convert valid received symbols, a halt state in which a predetermined number of halt symbols are transmitted by the encoder, and an idle state in which idle symbols are transmitted, and in which said step of disabling further includes the step of;
   a) switching said encoder from said reset state to said halt state.

3. The method recited in claim 2 including the further steps of,
   a) transmitting a predetermined number of halt symbols from said encoder after said encoder is switched to said halt state, and
   b) switching saide encoder to said idle state after said predetermined number of halt symbols have been transmitted.

4. The method recited in claim 3 including the further step of,
   a) supplying said mode control signal to said encoder to place said encoder in said parity check mode,
   b) switching said encoder from said halt state to said idle state before said predetermined number of halt symbols are transmitted including the steps of,
      1) detecting that an IDLE symbol has been received by said encoder before said predetermined number of halt symbols have beeen transmitted, and 2) determining that said received IDLE symbol has the correct parity before switching to said idle state.

5. The method recited in claim 4 including the further step of,
   a) switching said encoder back to said reset state including the steps of,
      1) detecting the reception of a start symbol pair, and
      2) determining that said received start symbol pair has correct parity prior to switching said encoder from said idle state to said reset state.

6. In an encoder responsive to a source of clock symbols which receives signals indicative of unencoded symbols, and converts said symbols to encoded symbols according to a predetermined code, wherein said unencoded symbols formed from an alphabet containing a set of proper symbols and a set of improper symbols, said encoder including means for performing a parity check on each said received unencoded symbol, said encoder further responsive to a signal indicative of whether said parity check is to be performed, the improvement wherein said encoder is responsive to a force halt signal which causes said encoder to repetitively generate a force halt signal a predetermined number of times, said encoder further includes means for disabling said encoder upon reception of one of said improper symbols or upon reception of a symbol not passing said parity check if said parity check is performed, said disabling means comprising:
   means (102, 106, 108, 110) responsive to signals representing said unencoded symbol for generating a plurality of signals each indicative of the detection of predetermined at least one of said improper symbols;
   means connected to said detection means and said parity check means for generating a plurality of logic signals; and
   means responsive to said plurality of logic signals and to said clock signals for generating said force halt signal.

7. In an encoder according to claim 6 wherein said disabling means further includes,
   a) means (128, 152, 154, 156, 158, 160) for generating a force idle signal, and
   further includes means responsive to said force idle signal which causes said encoder to repetitively generate idle signals.

8. In an encoder according to claim 7 wherein said signals indicative of said unencoded signals comprise a most-significant plurality of signals and a least-significant plurality of signals said improper symbol detection means comprises:
   first means (106) responsive to said most-significant plurality of unencoded signals for detecting said predetermined ones of said plurality of improper signals and for generating a signal indicative thereof;
   second means (110) responsive to said least-significant plurality of converted signals for detecting said predetermined ones of said plurality of improper signals and for generating a signal indicative thereof;
   a fourth OR gate (118) receiving said signals generated by said first and said second detection means and generating therefrom said signal indicative of the detection of said predetermined ones of said improper signals.

9. In an encoder according to claim 6 said encoder further generating an enable signal wherein said detection means includes:
   means (102) responsive to said unencoded symbol signals for generating a signal indicative of the detection of a predetermined start data (SD) symbol-pair;
   means responsive to said unencoded symbol signals for generating a signal indicative of the detection of predetermined ones of said improper symbols;
   wherein said logic means generates a "JK" logic signal indicative of the detection of said SD symbol-pair and the absence of said parity error signal, said logic mean generates a "QHV" logic signal indicative of the detection of one of said improper symbols, wherein said force halt generating means comprises:
   first set-reset (SR) flip-flop means (130) receiving at a set input said JK logic signal, at a clock input said clock signals, and having a reset terminal, for generating a start-of-data packet (SDP) signal;
   a first AND gate (132) receiving said SDP signal and said QHV signal and generating therefrom a signal at an output terminal, said output signal conducted to said reset terminal of said first (SR) flip-flop;
   second set-reset (SR) flip-flop means (136) receiving at a set input said output signal generated by said first AND gate, receiving at a clock input said clock signals and having a reset terminal, for generating a QHVP signal, said QHVP signal conducted to said reset terminal of said second (SR) flip-flop;
   a second AND gate (138) receiving at a true input said signal generated by said first AND gate, and at a complemented input said QHVP signal and generating therefrom a signal at an output terminal;
   a third AND gate (140) receiving at a first complemented input said JK signal, at a true input said QHVP signal and at a second complemented input said SDP signal and generating therefrom a signal at an output terminal;
   a first OR gate (142) receiving said signals generated by said second and said third AND gate and generating therefrom a signal at an output terminal;
   means (148, 150) responsive to said clock signals and said enable signal for generating a state machine enable signal whenever said start of data is detected; and
   a fourth AND gate (144) receiving at a complemented input said force idle signal, at a first true input said signal generated by said first OR gate, and at a second true input said state machine enable signal and generating therefrom said force halt signal.

10. In an encoder according to claim 9 wherein said disabling means further includes means for generating said force idle signal, wherein said improper alphabet contains an I symbol and said detection means further includes means responsive to said converted symbol signals for generating a signal indicative of the detection of said I symbol; wherein said logic means further generates a signal indicative of the detection of said I symbol and the absence of said parity check signal; wherein said force idle generating means comprises:
   third set-reset (SR) slip-flop means (152) receiving at a set input said signal indicative of the detection of said I symbol, receiving at a reset terminal said JK signal, receiving at a clock input said clock signals for generating therefrom a signal at an output terminal;

a fifth AND gate (154) receiving at a true input said signal generated by said third (SR) flip-flop and at a complemented input said JK signal and generating therefrom a signal at an output terminal;

a sixth AND gate (158) receiving at a first complemented input said QHVP signal, at a second complemented input said SDP signal and at a third complemented input said JK signal and generating therefrom a signal at an output terminal;

a second OR gate (156) receiving at a first input said signal indicative of the detection of said I symbol, at a second input said signal generated by said fifth AND gate, and at a third input said signal generated by said sixth AND gate and generating therefrom a signal at an output terminal; and a seventh AND gate (160) receiving said signal generated by said second OR gate and said state machine enable signal and generating therefrom said idle signal.

11. In an encoder according to claim 9 wherein said means for generating said state machine enable signal comprises:

a third OR gate (148) receiving said JK signal and said enable signal and generating therefrom a signal at an output terminal; and a D-type flip-flop means (150) receiving at a data input said signal generated by said third OR gate, receiving at a clock input said clock signals, for generating said state machine enable signal at an output terminal.

12. In an encoder according to claim 10 wherein said signals indicative of said unencoded signals include a most-significant plurality of signals, and said I symbol detection means comprises:

means (108) responsive to said most-significant plurality of unencoded signals for detecting said I symbol and for generating a signal indicative thereof.

* * * * *